United States Patent [19]
Wismer et al.

[11] Patent Number: 6,118,998
[45] Date of Patent: Sep. 12, 2000

[54] SPACECRAFT CELLULAR COMMUNICATION SYSTEM WITH SPOT BEAM PAIRING FOR REDUCED UPDATES

[75] Inventors: Lee D. Wismer, Downingtown; Stephen James Wozniak, Royersford, both of Pa.

[73] Assignee: Lockheed Martin Corporation, King of Prussia, Pa.

[21] Appl. No.: 09/133,176

[22] Filed: Aug. 12, 1998

Related U.S. Application Data

[60] Provisional application No. 60/059,311, Sep. 17, 1997.
[51] Int. Cl.[7] .............................. H04B 7/185; H04B 7/18; H09Q 7/20
[52] U.S. Cl. ......................... 455/427; 455/426; 455/430; 455/12.1
[58] Field of Search ........................... 455/12.1, 427–430, 455/456, 457, 435

[56] References Cited

U.S. PATENT DOCUMENTS

| | | | |
|---|---|---|---|
| 5,161,248 | 11/1992 | Bertiger et al. ........................... | 455/17 |
| 5,641,134 | 6/1997 | Vatt ....................................... | 244/158 R |
| 5,937,352 | 8/1999 | Courtney et al. ....................... | 455/435 |
| 6,019,318 | 2/2000 | Cellier et al. ......................... | 244/158 R |

*Primary Examiner*—Thanh Cong Le
*Assistant Examiner*—Meless Zewdu
*Attorney, Agent, or Firm*—W. H. Meise

[57] ABSTRACT

A communication system includes a spacecraft which produces a plurality of overlapping spot beams. The spacecraft moves periodically in the N-S direction. Terrestrial user terminals may lie in one spot beam when the spacecraft is in one position, and in another spot beam at a later time. The system also maintains a log of the spot beam location of the user terminals, so all the spot beams do not have to be polled to find the desired one. In order to avoid system loading by location updates resulting from spacecraft motion, the spot beam location of each user terminal is stored in paired form. When a particular user terminal is to be contacted, transmission is performed over both spot beams of the pair. Update occurs only if the user terminal is not in either spot beam of the pair.

1 Claim, 3 Drawing Sheets

SPACECRAFT CELLULAR COMMUNICATION SYSTEM WITH SPOT BEAM PAIRING FOR REDUCED UPDATES

This patent application claims priority of provisional patent application Ser. No. 60/059,311, filed Sep. 17, 1997.

FIELD OF THE INVENTION

This invention relates to communications systems, and more particularly to spacecraft-based cellular communications systems.

BACKGROUND OF THE INVENTION

Mobile cellular communication systems have become of increasing importance, providing mobile users the security of being able to seek aid in case of trouble, allowing dispatching of delivery and other vehicles with little wasted time, and the like. Present cellular communication systems use terrestrial transmitters, such as towers, to define each cell of the system, so that the extent of a particular cellular communication system is limited by the region over which the towers are distributed. Many parts of the world are relatively inaccessible, or, as in the case of the ocean, do not lend themselves to location of a plurality of dispersed cellular sites.

In these regions of the world, spacecraft-based communication systems may be preferable to terrestrial-based systems. It is desirable that a spacecraft cellular communications system adhere, insofar as possible, to the standards which are common to terrestrial systems, and in particular to such systems as the GLOBAL SYSTEM FOR MOBILE COMMUNICATIONS system (GSM), which is in use in Europe.

The GSM system is a cellular communications system which communicates with user terminals by means of electromagnetic transmissions from, and receptions of such electromagnetic signals at, base stations, fixed sites or towers spaced across the countryside. The term "user terminal" for purposes of this patent application includes mobile user terminals, and also includes hand-held and fixed user terminals, but not gateways. The GSM system is described in detail in the text *The GSM System for Mobile Communications,* subtitled *A Comprehensive Overview of the European Digital Cellular System,* authored by Michel Mouly and Marie-Bernadette Pautet, and published in 1992 by the authors, at 4, rue Elisée Reclus, F-91120 Palaiseau, France. Another text describing the GSM system is *Mobile Radio Communications,* by Raymond Steele, published 1992 by Pentech Press, London, ISBN 0-7273-1406-8. Each base station of the GSM system includes transmitter and receiver arrangements, and communicates with user terminals by way of signals in a bandwidth of 50 Mhz, centered on 900 Mhz., and also by way of signals having a bandwidth of 150 Mhz centered on 1800 Mhz.

A cellular communication system should provide one or more control channels for allowing a user terminal to initially synchronize to the system, and to initiate communications with the overall network. Each base station, fixed site, or tower continually transmits network synchronization information (SCH) and network-specific information (BCCH), which a user terminal uses to synchronize to the appropriate network at initial turn-on of the user terminal. The GSM system provides a channel denominated "Random Access Channel" or RACH. In GSM, the RACH channel is used for initial synchronization of the network to the user terminal.

Spacecraft cellular communication systems are desired.

SUMMARY OF THE INVENTION

A spacecraft cellular communication system, for communicating among a plurality of terrestrial user terminals, includes a spacecraft in a geosynchronous orbit. The spacecraft includes a transponder for receiving uplink signals from Earth, and for transmitting information on a plurality of spot beams covering a service region. The spot beams define overlapping footprints on the service region. The system also includes an associated ground or terrestrial network for generating system control signals, for maintaining a register of user terminal spot beam locations, and at least one Earth station for communicating with the spacecraft, and by way of the spacecraft with user terminals. The ground network transmits signals intended for particular user terminals over a spot beam registered to those terminals in the register of user terminal spot beam location, in order to avoid having to transmit signals for a particular user terminal over all the spot beams. The communication system also includes a plurality of terrestrial user terminal, which are located within the service region of the spacecraft. Each user terminal is capable of identifying that one of the spot beams in the footprint of which it lies, by examining the control signals transmitted on the associated spot beam, and is also capable of remembering the identity of that spot beam by which it was last connected to the system. Each user terminal is also capable of transmitting user terminal spot beam location update information to the network control center when its spot beam location has changed since the last system connection of the user terminal. Diurnal station variations of the spacecraft result in a tendency toward diurnal variation or movement in the locations within the service area at which spot beam overlap occurs. The motion of the spot beam overlap locations causes those of the user terminals which are located near an overlap region to experience a diurnal change in spot beam location even if the user terminal remains stationary. This, in turn, necessitates twice-daily transmission of location updates over the communication system from all user terminals so situated. The frequent user updates from large numbers of user terminals undesirably loads the communication system, and reduces its useful throughput. The communication system includes additional means at (or in) the ground network, (i) for storing at least a spot-beam pair location for each of the user terminals, and (ii) for, when initiating communication with a particular one of the user terminals, transmitting to the particular one of the user terminals over the pair of spot beams. At each of the user terminals, additional means are provided for (A) storing information relating to either (a) the spot beam location which the user terminal last registered with the ground network, or (b) the spot beam location pair which the user terminal last registered with the ground network, (B) comparing (i) the spot beam location of the current communication of the user terminal over the communication system with (ii) the spot beam locations stored in the additional means, and (C) transmitting spot beam location update information to the ground system only if the spot beam location of the current communication is not found in the additional means. As a result, no update information is transmitted as long as the user terminal is in a spot beam pair registered with the ground network, and the diurnal variation in the locations of the spot beam overlaps does not result in system loading.

In one embodiment of the invention, the spot beams generated by the spacecraft are radiated at fixed, nonadjustable angles relative to each other. In another embodiment of the invention, the overlap of a spot beam pair is controlled by a feedback controller to lie on a particular location in the service region.

DESCRIPTION OF THE INVENTION

This invention relates to cellular communications systems, and more particularly to such systems which provide coverage between terrestrial terminals in a region by way of a spacecraft, where some of the terrestrial terminals may be mobile terminals, and some may be gateways which links the cellular system with a terrestrial network such as a public switched telephone network (PSTN).

A salient feature of a spacecraft communication satellite is that all of the electromagnetic transmissions to the user terminals originate from one, or possibly a few, spacecraft, which may nominally be in equatorial orbits. Consequently, the spacecraft communication antenna must form a plurality of beams, each of which is directed toward a different portion of the target region or region served, so as to divide the target area into cells. The cells defined by the beams will generally overlap, so that a user communication terminal may be located in one of the beams, or in the overlap region between two beams, in which case communication between the user communication terminal and the spacecraft is accomplished over one of the beams, generally that one of the beams which provides the greatest gain or signal power to the user terminal. Operation of spacecraft communication systems may be accomplished in many ways, among which is Time-Division Multiple Access, (TDMA). Contention-type TDMA systems are described, for example, in conjunction with U.S. Pat. No. 4,641,304, issued Feb. 3, 1987, and U.S. Pat. No. 4,688,213, issued Aug. 18, 1987, both in the name of Raychaudhuri. Spacecraft time-division multiple access communication systems are controlled by a controller which synchronizes the transmissions to account for propagation delay between the terrestrial terminals and the spacecraft, as is well known to those skilled in the art of time division multiple access systems. The control information, whether generated on the ground or at the spacecraft, is ultimately transmitted from the spacecraft to each of the user terminals. Consequently, some types of control signals must be transmitted continuously over each of the beams in order to reach all of the potential users of the system. More specifically, since a terrestrial terminal may begin operation at any random moment, the control signals must be present at all times in order to allow the terrestrial terminal to begin its transmissions or reception (come into time and control synchronism with the communication system) with the least delay.

When the spacecraft is providing cellular service over a large land mass, many cellular beams may be required. In one embodiment of the invention, the number of separate spot beams is one hundred and forty. As mentioned above, each beam carries control signals. These signals include frequency and time information, broadcast messages, paging messages, and the like. Some of these control signals, such as synchronization signals, are a prerequisite for any other reception, and so may be considered to be most important. When the user communication terminal is synchronized, it is capable of receiving other signals, such as paging signals.

Communication Spacecraft are ordinarily powered by electricity derived from solar panels. Because the spacecraft may occasionally go into eclipse, the spacecraft commonly includes rechargeable batteries and control arrangements for recharging the batteries when the power available from the solar panels exceeds the power consumed by the spacecraft payload. When a large number of cellular beams are produced by the antenna, a correspondingly large number of control signals must be transmitted from the spacecraft. When one hundred and forty beams are transmitted, one hundred and forty control signals must be transmitted. When the power available from the solar panels is divided between the information and data transmission channels of the spacecraft, the power available to the synchronization and paging signals may be at a level such that a user communication terminal in an open-air location may respond, but a similar terminal located in a building may not respond, due to attenuation of electromagnetic signals by the building.

Figure 1:
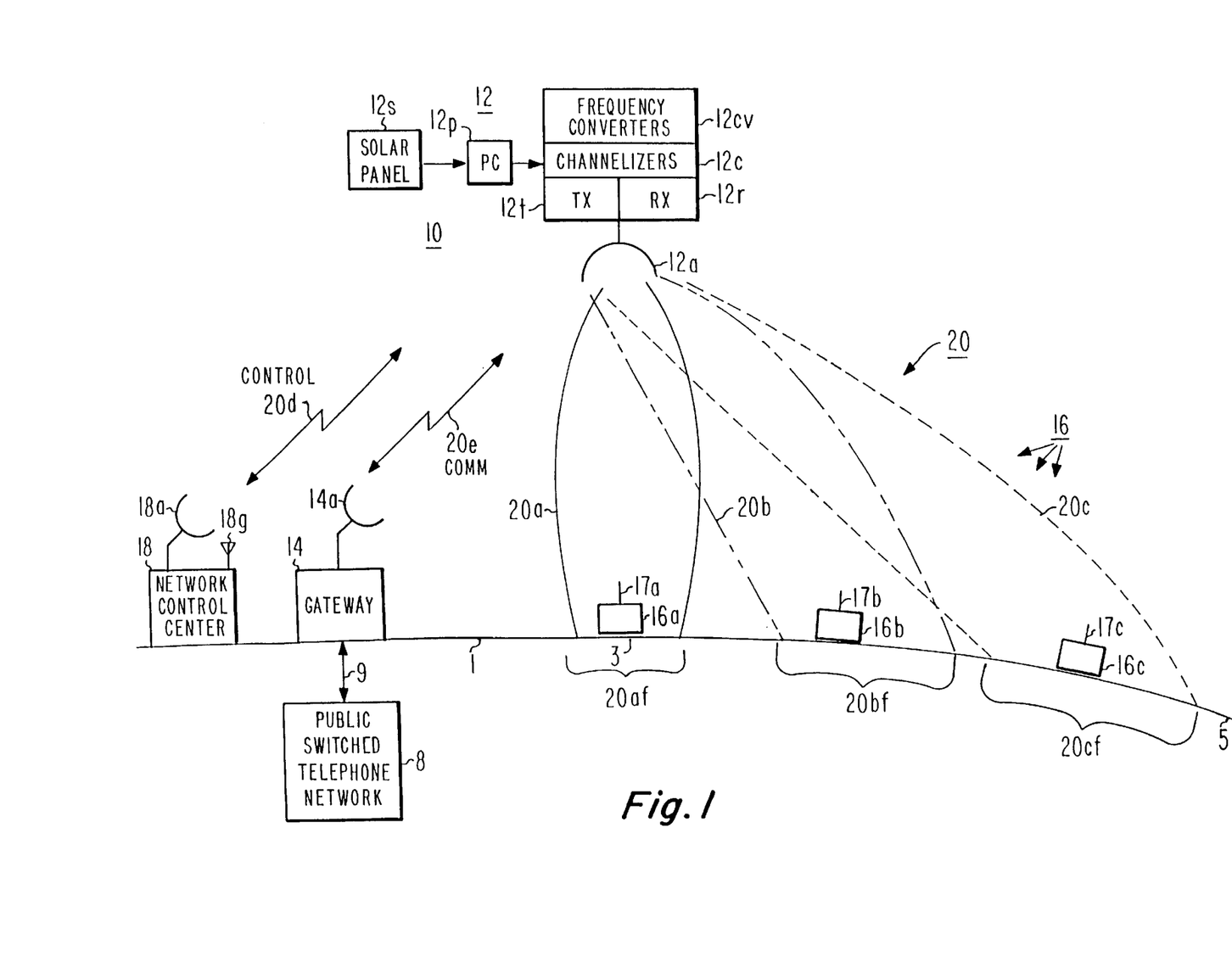
FIG. 1 is a simplified diagram of a spacecraft cellular communications system in accordance with an aspect of the invention, illustrating some antenna beams which define system cells, and the extent of footprints of antenna beams directed at the nadir and at the horizon.

FIG. 1 is a simplified block diagram of a spacecraft or satellite cellular communications system 10. In system 10, a spacecraft 12 includes a transmitter (TX) arrangement 12t, a receiver (RX) arrangement 12r, and a frequency-dependent channelizer 12c, which routes bands of frequencies from the receiver 12r to the transmitter 12t. Spacecraft 12 also includes an array of frequency converters 12cv, which convert each uplink frequency to an appropriate downlink frequency. Spacecraft 12 includes a power source which includes a solar panel (SP) illustrated as 12s, and a power converter (PC) or conditioner 12p for converting the solar array power into power suitable for powering the transmitter, receiver, and converters, and other devices on the spacecraft, such as, for example, attitude control systems. Antenna 12a generates a plurality 20 of spot beams, one or more spot beams for each frequency band. Some of the spot beams 20a, 20b, and 20c of set 20 are illustrated by their outlines, while others, such as 20d and 20e, are illustrated by "lightning bolt" symbols in order to simplify the drawing. Each spot beam 20x (where x represents any subscript) defines a footprint on the surface 1 of the earth below. The footprint associated with spot beam 20a is at the nadir 3 directly under the spacecraft, and is designated 20af. The footprint associated with spot beam 20c is designated 20cf, and is directed toward the horizon 5, while the footprint 20bf associated with spot beam 20b is on a location on surface 1 which lies between nadir 3 and horizon 5. It will be understood that those spot beams which are illustrated in "lightning bolt" form also produce footprints. As is known to those skilled in the art, the footprints of spot beams from a spacecraft may overlap (overlap not illustrated), to provide continuous coverage of the terrestrial region covered by the spot beams.

In a slightly different embodiment of the invention than that illustrated, a separate antenna (not illustrated), other than antenna 12a, may be used to generate beams 20d and 20e, and those beams may be broader than spot beams.

For completeness, it should be noted that each antenna beam forms an infinite number of more-or-less concentric "footprints" centered about the maximum-beam-intensity point on the ground, with each of the footprints being a fraction of a decibel (dB) less than the next inner footprint. When "a" footprint is discussed, a selected energy distribution across the "footprint" is assumed. Thus, a common assumption is that the beam intensity will not vary more than 3 dB across the footprint, which defines the extent of the footprint by the 3 dB contour of the antenna beam. Similarly, overlap of the beams is taken to mean overlap at about the designated beam intensity.

As illustrated in FIG. 1, a group 16 of mobile terrestrial user terminals or stations includes three user terminals, denominated 16a, 16b, and 16c, each of which is illustrated as having an upstanding whip antenna 17a, 17b, and 17c, respectively. User terminal 16a lies on or within the footprint 20af, user terminal 16b lies within footprint 20bf, and user terminal 16c lies within footprint 20cf. User terminals 16a, 16b, and 16c provide communications service to users, as described below. Those skilled in the art will recognize that the illustration of a single user terminal in each footprint is only for ease of understanding, and that many such user terminals may be found in each footprint. More particularly, each illustrated user terminal 16a represents one of a plurality of user terminals which may be found within footprint 20af, and likewise illustrated user terminals 16b and 16c each represent one of a plurality of user terminals which may be found in footprints 20bf and 20cf, respectively.

FIG. 1 also illustrates a terrestrial gateway terminal (a fixed site, tower, or station) 14, which lies in a footprint (not designated) of spot beam 20e. While not illustrated, it should be understood that the footprint associated with spot beam 20e may also contain user terminals such as $16_x$. Gateway terminal 14 communicates with spacecraft 12 by way of electromagnetic signals transmitted from an antenna 14a, and receives signals from the spacecraft by way of the same antenna. Gateway terminal 14 is coupled by a data path 9 with a land-line network or public switched telephone system (PSTN) illustrated as a block 8, and provides communication between spacecraft cellular communications system 10 and the PSTN 8. While a single gateway 14 is illustrated, the communication system 10 may contain many gateways at spaced-apart locations, to allow the spacecraft communication system to access different PSTNs. The signals traversing antenna beam 20e represent information signals from the user terminals 16 to the gateway terminal 14, and information signals from the gateway to various ones of the user terminals. The information communication signals are designated generally as COMM.

A network control center (NCC) 18 is illustrated in FIG. 1 as a terrestrial terminal lying in a footprint (not designated) of antenna beam 20d, which may also contain user terminals (not illustrated). Network control center 18 includes an antenna 18a for communication with the spacecraft, and for communication by way of the spacecraft to the user terminals 16 and the gateway(s) 14. Network control center 18 also includes a GPS receiving antenna 18g for receiving global positioning time signals, to provide position information and an accurate time clock. Network control center 18 performs the synchronization and TDMA slot control which the spacecraft cellular communications network requires. The functions of network control center 18 may be distributed throughout the ground network or terrestrial portions of communication system 10, but unlike the arrangement of the GPS system, in which control of the slot timing is independently set at each cell center or tower, there is only one network control center associated with the spacecraft communication system 10, for the required control of the time-division multiple access slots cannot be applied simply to one cell or antenna beam, but rather must be applied across the entire system. Thus, if the network control center is distributed across the ground network, the different portions of the network control center must communicate with each other through the system in a manner which makes them function as a whole. While network control center 18 is illustrated in FIG. 1 as being separate from gateway 14, those skilled in the art will recognize that the network control center 18 includes functions, such as the antenna 18a, which are duplicated in the gateway 14, and that it may make economic sense to place the network control center 18, or the portions which together make up the network control center, at the sites of the gateway(s) such as gateway 14, so as to reduce the overall system cost by taking advantage of the redundancies to eliminate expensive subsystems. The signals traversing antenna beam 20d between NCC 18 and spacecraft 12 represent control signals. "Forward" control signals proceed from the NCC 18 to the remainder of the communication system 10 by way of spacecraft 12, and "reverse" or "return" control signals are those which originate at terrestrial terminals other than the NCC, and which are sent to the NCC by way of the spacecraft. Forward control signals include, for example, commands from the NCC 18 to the various user terminals $16_x$, indicating which slot set is to be used by each user terminal for communication, while an example of a return control signal may be, for example, requests by various user terminals $16_x$ for access to the communication system 10, or updates of their spot-beam locations. Other control signals are required, some of which are described in more detail below. As mentioned, those control signals flowing from NCC 18 to other portions of the communication system 18 are termed "forward" control signals, while those flowing in a retrograde direction, from the communication system 10 toward the NCC, are denominated "returns" control signals.

The spacecraft 12 of FIG. 1 may need to produce many spot beams 20, and the transmissions over the spot beams may require substantial electrical power, at least in part because of the relatively low gain of the simple antennas 17 of the user terminals 16. In order to reduce the power required by the transmitters in the spacecraft, the largest number of downlink frequencies, namely those used for transmissions from the spacecraft to terrestrial user terminals, are desirably within a relatively low frequency band, to take advantage of the increased component efficiencies at the lower frequencies. The user terminals transmit to the spacecraft at the lower frequencies, for like reasons. The transmissions to and from the spacecraft from the NCC 18 and the gateway(s) 14 may be within a higher frequency band, in part because of FCC frequency allocation considerations, and in part to obtain the advantage of high antenna gain available at the higher frequencies from antennas at fixed installations. In a specific embodiment of the invention, the uplinks and downlinks of the NCC and the gateways may be at C-band (frequencies at about 3400 to 6700 Mhz.), while the uplinks and downlinks of the user terminals are at L-band (frequencies at about 1500–1700 MHz). Thus, the uplink and downlink signals in antenna beams 20a, 20b, and 20c of FIG. 1 are at frequencies within the relatively low L-band, while the uplink and downlink signals in antenna beams 20d and 20e are at the higher C-band.

Figure 2:
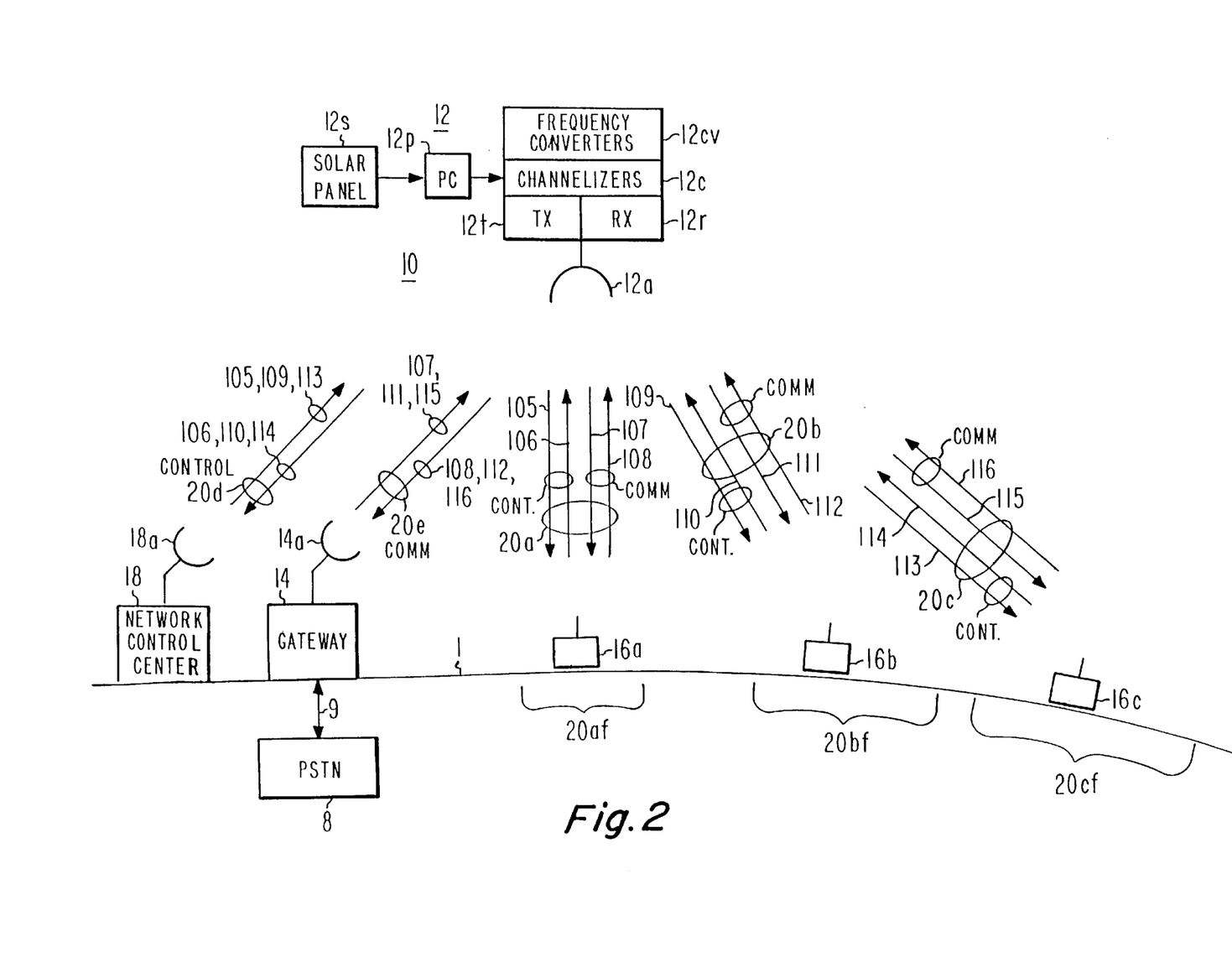
FIG. 2 is a simplified diagram similar to FIG. 1, illustrating some of the signals which flow over the various antenna beams.

FIG. 2 is similar to FIG. 1, except that, instead of illustrating the antenna beams $20_x$ (where the subscript x represents any one of the antenna beams) as a whole, some of the individual carriers contained in the beams are illustrated separately. For example, some of the forward control signals flowing from network control center 18 to the spacecraft 12 over antenna beam 20*d* are designated 105, 109, and 113, while some of the return control signals flowing from the spacecraft 12 to the NCC 18 by way of antenna beam 20*d* are designated 106, 110, and 114. Each of these control signals is transmitted on a carrier of a different frequency, for reasons described below. Thus, the designations 105, 106, 109, 110, 113, and 114 in FIG. 2 may each be imagined to represent a different carrier frequency within C band. In practice in one embodiment of the invention, each of the forward control signals has a bandwidth of 200 KHz. As described below, each of the different uplinked control signal carriers will ultimately be routed to a different one of the antenna beams and its associated footprint; three footprints are illustrated in FIGS. 1 and 2, so three uplinked forward control signal carriers are illustrated, namely carriers 105, 109, and 113. Similarly, each of the different return control signal carriers 106, 110, 114 downlinked from spacecraft 12 is generated by a user terminal 16 in a different one of the footprints illustrated in FIGS. 1 and 2; three footprints are illustrated, so the downlink portion of antenna beam 20*e* includes the three carriers 106, 110, and 114.

As mentioned above in relation to the discussion of FIG. 1, the spacecraft 12 includes frequency-dependent channelizers 12*c* and frequency converters 12*cv*. The three forward control signals 105, 109, and 113 uplinked from NCC 18 of FIG. 2 to the spacecraft are received at antenna 12*a* of the spacecraft, and routed by way of the channelizers 12*c* of the spacecraft to an appropriate one of the frequency converters 12*cv*, where they are frequency converted. For example, uplinked forward control signal 105 of FIG. 2 arriving at the spacecraft over antenna beam 20*d* at C-band is converted from C-band to a frequency within L-band. In order to make it easy to track the flow of signals in FIG. 2, the L-band frequency corresponding to C-band frequency 105 is also designated 105. It is easy to keep the meaning of these identical designations in mind, by viewing them as identifying the control signals being transmitted; the forward control information on C-band uplink "frequency" 105 is retransmitted from the spacecraft, after frequency conversion to L-band, within antenna beam 20*a*, as downlink 105. Thus, the forward control signal information for all user terminals 16*a* lying within footprint 20*af* is uplinked from NCC 18 in C-band to the spacecraft over antenna beam 20*d*, and converted to L-band downlink frequency 105 at the spacecraft, and transmitted in the L-band form over antenna beam 20*a* for use by all user terminals 16*a* within footprint 20*af*. Similarly, uplinked control signal 109 arriving at the spacecraft over antenna beam 20*d* at C-band is converted from C-band to a frequency within L-band. In order to make it easy to track the flow of signals in FIG. 2, the L-band frequency corresponding to C-band frequency 109 is also designated 109. The control information on C-band uplink "frequency" 109 is retransmitted from the spacecraft on L-band, within antenna beam 20*b*, as downlink 109. Thus, the forward control signal information for all user terminals 16*b* lying within footprint 20*bf* is uplinked from NCC 18 in C-band to the spacecraft over antenna beam 20*d*, and converted to an L-band downlink frequency 109 at the spacecraft, and transmitted in the L-band form over antenna beam 20*b* for use by all user terminals 16*b* within footprint 20*bf*. For completeness, control signals generated at NCC 18 for ultimate transmission to user terminals 16*c* in footprint 20*cf* are generated at C-band at a frequency 113, different from frequencies 105 and 109, and are uplinked from NCC 18 to spacecraft 12. The C-band control signal 113 received at spacecraft 12 is frequency-converted to a frequency, designated as 113, in L-band, and transmitted over antenna beam 20*c* for use by all user terminals 16*c* lying in footprint 20*cf*. It should be noted that the fact that forward control signals are transmitted on the same carriers to a group of user terminals 16 lying in a particular footprint does not necessarily mean that all the user terminals within that footprint must operate simultaneously or in the same manner; instead, within each control signal carrier, a plurality of TDMA slots are available, and each set of slots is capable of being directed or assigned to a different one of the user terminals within the footprint being controlled, so that the user terminals are individually controllable. Of course, simultaneous reception of broadcast forward control signals by all user terminals within a footprint is possible, and all user terminals receive information signals "simultaneously," in that they may all be receiving transmissions at the same "time" as measured on a gross scale, although each individual message is received in a different time slot allocation. It should also be noted that, while control signals have not been described as being transmitted over antenna beam 20*e* between spacecraft 12 and gateway 14, the gateway (and any other gateways throughout the system) also require such control signal transmission. In the event that the NCC and the gateway are co-located, the control signals flowing therebetween may be connected directly, rather than by being routed through the spacecraft.

When a user terminal $16_x$ (where the subscript x represents any one of the user terminals) of FIG. 2 is initially turned on by a user, the user terminal will not initially have an assigned slot. In order to advise the NCC 18 that the user terminal is active and wishes to be assigned a slot by which it may communicate, the user terminal must first synchronize to the forward control signals, and then transmit a reverse control signal to the NCC 18 by way of spacecraft 12, requesting access in the form of assignment of an information carrier time slot. Thus, in addition to the forward control signals flowing from NCC 18 to the user terminals $16_x$, additional return control signals also flow from the user terminals to the NCC 18. These control signals originating from the user terminals lying within a particular footprint are modulated onto uplink carriers at L-band and transmitted to the spacecraft, where they are converted to frequencies lying in C-band for transmission to the NCC 18. More particularly, return control signals originating at user terminals 16*a* lying within footprint 20*af* are modulated onto an L-band uplink carrier frequency designated as 106 in FIG. 2. The return control signals are received by spacecraft antenna 12*a* in beam 20*a*, and routed by channelizer 12*c* to the appropriate frequency converter of converter array 12*cv* for conversion to C-band frequency 106. C-band frequency 106 is routed by way of transmitter 12*t* to antenna 12*a*, for transmission over antenna beam 20*d* to NCC 18. Similarly, return control signals originating at user terminals 16*b* lying within footprint 20*bf* are modulated onto an L-band uplink carrier frequency designated as 110 in FIG. 2. The return control signals are received by spacecraft antenna 12*a* in beam 20*b*, and routed by channelizer 12*c* to the appropriate frequency converter 12*cv* for conversion to C-band frequency 110. C-band frequency 110 is routed by way of transmitter 12*t* to antenna 12*a*, for transmission over antenna beam 20*d* to NCC 18. For completeness, return control signals from user terminals 16*c* in footprint 20*cf* are modulated onto an L-band uplink carrier frequency designated as 114, and are received by spacecraft antenna 12*a* in beam 20*c*, routed to the appropriate frequency converter 12*cv*, converted to C-band frequency 114, and transmitted over antenna beam 20*d* to NCC 18. Thus, NCC 18 transmits a single forward control signal carrier to each downlink spot beam 20a, 20b, 20c, ... on a carrier at a frequency which identifies the downlink spot beam to which the forward control signal is directed. NCC 18 receives return control signals from the various user terminals in footprints associated with the spot beams, and one return carrier is associated with each spot beam. In each spot beam, user terminals receive forward control signals over a carrier in an L-band downlink, and transmit return control signals over an L-band uplink. Spot beam 20a is associated with forward and return control signal carriers 105 and 106, respectively, spot beam 20b is associated with forward and return control signal carriers 109 and 110, respectively, and beam 20c is associated with forward and return control signal carriers 113 and 114, respectively.

Only the control signal carriers have been so far described in the arrangement of FIG. 2. The whole point of the communication system 10 is to communicate information signals among the users, so each antenna beam also carries signal carriers on which information signals are modulated or multiplexed by FDMA/TDMA, under control of the NCC 18. It should first be noted that NCC 18 of FIG. 2 does not need any information signal carriers (unless, of course, it is associated with a gateway terminal, as described above). In general, information signals flow between gateways and user terminals. More particularly, signals from public switched telephone system 8 of FIG. 2 which arrive over data path 9 at gateway 14 must be transmitted to the designated user terminal or other gateway, which is likely to be served by an antenna beam other than beam 20d which serves gateway 14. Gateway 14 must communicate the desired recipient by way of a return control signal to NCC 18, and receive instructions as to which uplink carrier is to be modulated with the data from PSTN 8, so that the data carrier, when frequency-converted by the frequency converters 12cv in spacecraft 12, is routed to that one of the antenna beams which serves the desired recipient of the information. Thus, when information is to be communicated from gateway 14 to the remainder of communication system 10, it is transmitted on a selected one of a plurality of uplink carriers, where the plurality is equal to the number of spot beams to be served. In the simplified representation of FIG. 2, three spot beams 20a, 20b, and 20c are served in the system, so gateway 14 must produce information signal carriers at three separate C-band uplink frequencies. These three carrier frequencies are illustrated as 107, 111, and 115. The information signal is modulated onto the appropriate one of the carriers, for example onto carrier 107, and transmitted to the spacecraft 12. At the spacecraft, the C-band carrier 107 is converted to an L-band frequency carrier, also designated 107, which is downlinked over spot beam 20a to those user terminals (and gateways, if any) lying in footprint 20af. Similarly, information modulated at gateway 14 onto C-band uplink carrier 111, and transmitted to the spacecraft, is converted to L-band carrier 111, and downlinked over spot beam 20b to user terminals lying in footprint 20bf. For completeness, information modulated at gateway 14 onto C-band uplink carrier 115, and transmitted to the spacecraft, is converted to L-band carrier 115, and downlinked over spot beam 20c to user terminals lying in footprint 20cf. Within each footprint, the various user terminals select the information signals directed or addressed to them by selecting the particular time slot set assigned by NCC 18 for that particular communication.

Each user terminal (and gateway, if any) lying in a footprint of system 10 of FIG. 2 must be able to transmit information to the spacecraft for reradiation to a desired recipient. In general, all user terminals communicate only with gateways. If a user terminal of the system wishes to communicate with another user terminal of the system, the information may be routed first to one of the gateways, and then from the gateway back to the intended recipient user terminal. In one mode of operation, not directly of interest to the invention, the user terminals may communicate directly with other user terminals in other spot beams. Thus, any user terminal 16a lying in footprint 20af of FIG. 2 communicates its information signals by modulating them onto (a selected slot set of) an L-band carrier 108. The transmission is received by antenna 12a of spacecraft 12, and the signal is routed by way of channelizers 12c to the appropriate frequency converter of converter array 12cv, where conversion to a C-band frequency takes place. For example, L-band uplink information signal carrier 108 received by the spacecraft in spot beam 20a is converted to a C-band carrier frequency also designated 108, which is downlinked over antenna beam 20e to gateway 14. Similarly, L-band uplink information signal carrier 112 received by the spacecraft in spot beam 20b is converted to a C-band carrier frequency also designated 112, which is downlinked over antenna beam 20e to gateway 14, and uplink signal carrier 116 of antenna beam 20c is converted to downlink carrier 116 of antenna beam 20e to gateway 14. The user terminals (and gateways) in each spot beam thus transmit their information signals on uplink carriers having frequencies selected so that, after frequency conversion and channelization at the spacecraft, the resulting downlink carriers travel the particular antenna beam which is directed toward the recipient gateway. Similarly, signals originating at a gateway are modulated onto carriers which, after frequency conversion and channelizing at the spacecraft, traverse that one of the spot beams associated with the footprint in which the designated recipient is located. It should be noted that part of the system control performed by the NCC 18 is to determine the spot-beam in which a designated mobile recipient is located by keeping a record of the last location of each identifiable user, so that each spot beam does not have to be individually polled each time a connection to a mobile user is requested, to "find" the desired mobile user.

Once a user terminal 16x of FIG. 2 which wishes to initiate service on the network is synchronized with the network, it transmits information on a spacecraft random access channel (S-RACH), which is part of the return control signal channel, by which control information is transmitted on an uplink such as 106 of FIG. 2. Since the particular user has not yet been assigned a slot set, the initial request for access is not scheduled by the NCC, but is transmitted within a slot, since time synchronization has already been achieved. The duration of the return control signal bursts generated by the user terminals must be short enough to fit within the NCC receiving slot interval, and should be sufficiently shorter than the slot interval to provide an appropriate guard interval. The durations of the transmitted return control signal bursts are predetermined at the time of manufacture of the user terminals, or set before use, to match the receive slot intervals of the system in which they are to be used.

In a communication system such as that so far described in conjunction with FIGS. 1 and 2, it is undesirable to expend spacecraft transmitter power unnecessarily, because the amount of available energizing power is limited by the power capability of solar panels 12s. Consequently, it is desirable, when communicating with a user terminal 16, to transmit the signal intended for that particular user terminal over only that antenna beam in which the user terminal is located. If it were only necessary to handle signals flowing from the user terminals to the gateway, this could be readily accomplished by simply responding to a user terminal only on (or over) the antenna beam on which initial communication was established. However, since initiation of communication with a particular user terminal is an ordinary use to which such a communication system is put, the network control system of the communication system includes a memory or register in which the location of each user terminal is stored. The location is stored in the form of an identification of that spot-beam in which each user terminal is to be found. The spot-beam location information is then used each time a communication is directed to one of the user terminals, by transmitting the signal intended for the particular one of the user terminals over the spot beam in which the register indicates that it is located. By not transmitting the signal over all of the spot beams to reach a user terminal located in one of the spot beams, the total transmitted power is significantly reduced. It should be emphasized that referring to "a" register is not intended to indicate that there is a single identifiable memory at a single location; the memories may be distributed over the various portions of the ground network.

However, the user terminals are mobile, so that there is no guarantee that the spot beam in which a user terminal was last found is the one in which it is now located. In order to keep the user terminal location register updated or current as to the present location of a user terminal, the user terminal might report, each time it was energized, which spot beam it occupied, and the network control center could then update the user terminal location memory. This technique requires reporting of the spot beam location each time a user terminal is energized, and constitutes an overhead which represents a significant loading of the available capacity of the communication system.

Another way to handle the problem of updating the user terminal location register, which would reduce the amount of system overhead, would be to maintain a register at the user terminal location, as for example in the handset, in which register the user terminal spot beam location for that particular user terminal could be stored. Since the identity of each spot beam is transmitted as a part of the control signal associated with the spot beam, a user terminal would not be required to transmit over the communication system in order to get the spot beam location information, so no system overhead over and above the ordinary control signals would be required. However, it is not the user terminal, but rather the network control center, which needs to know each user terminal's spot-beam location, so that it can pinpoint the spot beam over which the information for that particular user terminal must be transmitted. If the user terminal, in this situation in which the handset included a register or memory, compared its present spot beam location with the one previously stored in its memory, and found that they were the same, the user terminal spot beam location register in the network control center would not need to be updated. On the other hand, if the user terminal, on being turned on, found itself in a spot beam other than the one from which it last transmitted, namely that one identified in its local memory, it could then transmit update information over the system for updating the system or network control center user terminal spot beam location register, and update its own local memory to reflect the information stored in the system user terminal location register. Thus, each user terminal would know, from its own local memory, the location which was at that time registered with the communication system as its own spot-beam location, and at turn-on, could make a comparison with its current location, and transmit location update information, only if the spot-beam location had changed, thereby much reducing the portion of the communication system's resources allocated to updating the user terminal spot beam location register of the ground network.

As mentioned above, the spacecraft used for cellular communications service may be in nominally equatorial orbits. It happens, possibly due to oblateness of the Earth, that a nominally equatorial orbit does not dwell exclusively above the equator, but drifts several degrees toward North and South. In the case of a geosynchronous nominally equatorial orbit, the north-south drift of the orbit occurs diurnally, or twice a day. The drift can be corrected or partially corrected by conventional spacecraft stationkeeping maneuvers. Correction of the north-south drift ultimately requires the use of spacecraft propellant, of which there is a limited supply. So much of the spacecraft propellant as is not required for stationkeeping can be used for attitude control. Consequently, it is desirable to minimize or eliminate the correction of the N/S drift in order to maximize the useful life of the spacecraft, as measured by operation of the attitude control system.

Figure 3A:
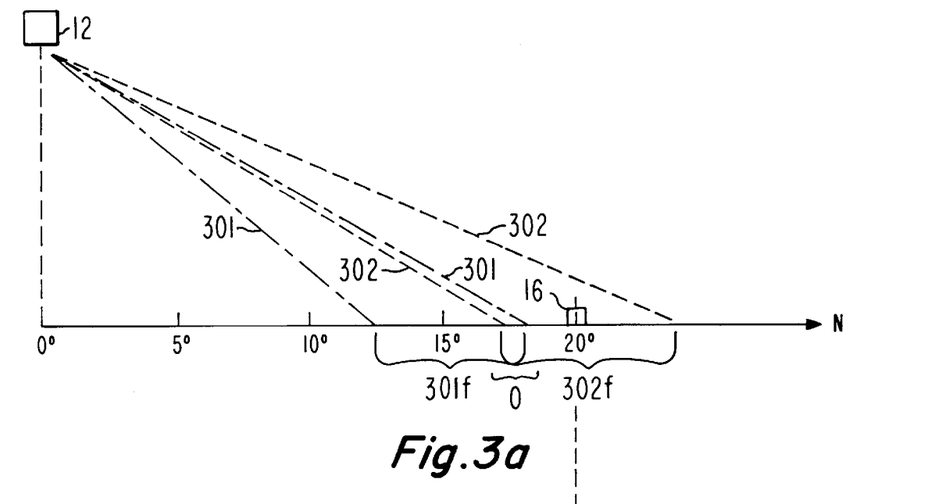
FIG. 3a is a simplified illustration of the extent of footprints of adjacent spot beams when the spacecraft is over the Equator.
Figure 3B:
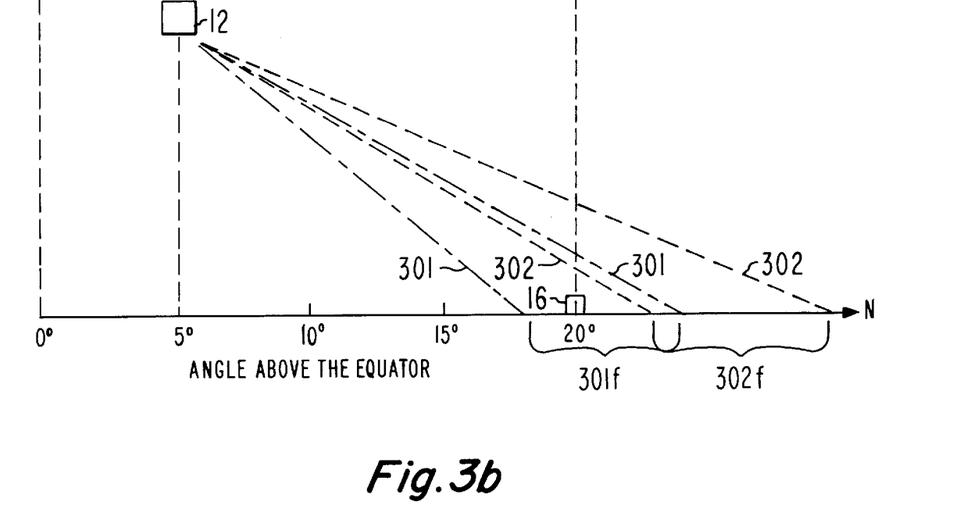
FIG. 3b is a representation similar to that of FIG. 3a, illustrating the movement of the spot beam footprints as a function of north-south drift of the spacecraft.

Diurnal N/S drift of the spacecraft results in positioning away from its nominal position. FIG. 3a is a simplified representation of a spacecraft 12 in a nominally equatorial orbit, at a time at which it lies directly over the Equator, illustrating two spot beams directed toward northern latitudes, measured in degrees north of 0°, where 0° represents the Equator. As illustrated in FIG. 3a, a first spot beam is defined by dot-dash lines 301, and its footprint is illustrated as 301f. A second spot beam is defined by dotted lines 302, and the associated footprint is 302f. The region of overlap between footprints 301 and 302 is indicated as O. A user terminal, designated as 16, is located at about 20° North latitude, and lies in footprint 2. Consequently, it has stored in its internal register the fact that it last transmitted in beam 302, indicating that at some previous time it has registered its location in spot beam 302 with the communication system ground network user terminal spot beam location register. FIG. 3b represents the same situation as that of FIG. 3a, several hours later, at a time at which the spacecraft 12 has moved in a northerly direction by about 5°. The footprints 301f and 302f of beams 301 and 302 have shifted in a northerly direction, in such a manner that user terminal 16, previously located in spot beam 2, is now in spot beam 1 even though the user terminal location is stationary. It is clear that the spot-beam location of the user terminal has changed as a result of the uncorrected or partially corrected drift of the spacecraft 12. As mentioned, the above-described drift of the spacecraft occurs diurnally for a spacecraft in a geosynchronous orbit. Consequently, the spot beam in which a user terminal lies can change four times daily, if it is near the overlap region between two beams. If a user terminal lies near the intersection of three beams, the number of daily changes may be greater. It must be understood that other factors enter into the decision of a user terminal to switch to an adjacent spot beam, including signal strength of the various carriers, and the like. The diurnal variation in the spot beam location of some of the user terminals can result in unwanted additional loading of the communication system with spot beam location update information.

One embodiment of the invention is expected to use a feedback control system which orients the spacecraft or the spacecraft antennas in order to keep the overlap junction of a specific pair of the spot beams fixedly pointing at a particular site on the Earth's surface. While this may tend to help the situation, it does not cure it, because the beam overlap locations nevertheless move as a result of the curvature of the Earth's surface and the angle at which the beams are formed relative to the surface. Thus, even a beam pointing control system cannot eliminate the communication system loading attributable to spot beam footprint overlap movement.

According to an aspect of the invention, communication system loading is reduced by keeping a record of user spot beam location pairs in the ground network user terminal spot beam location register. The user terminal also stores a spot-beam pair instead of a single spot beam location as indicative of the user location registered with the ground network. The ground network, when attempting to initiate communication with that particular user terminal, transmits on both spot beams of the registered pair. Once the communication is established, the attempted communication is abandoned on that one spot beam which provides the weaker link or connection.

In general, the above spot-beam pairing control is accomplished by a system by which the user terminal, the first time it turns on, reporting the identity of that spot beam in which it finds itself, and storing that spot beam in its local memory. In this system, the network control center or ground system transmits on the control signal associated with each spot beam information identifying not only the spot beam itself, but also the identities of those spot beams which may constitute acceptable spot-beam pairs, which in general will be the beams with footprints immediately to the north and south of the footprint of the spot beam in question.

For a user terminal which is located near the center of a first spot beam footprint, and seldom leaves that location, it will always find itself in the same spot beam (beam 1) as that one stored in its memory as having been registered, and will never need to update its registered location unless it moves to another beam.

On the other hand, a user terminal located near the boundary of the footprint of spot beam 1, upon initially being energized, will similarly register the initial spot beam, and record that spot beam, namely spot beam 1, in its local memory as having been registered. When it is later energized, the user terminal will, upon evaluating all of the carriers available to it for communication quality, determine that spot beam 2 is the best link, and therefore that the user terminal is "in" spot beam 2, or more properly in its footprint. The user terminal then compares its spot beam location with the locally stored spot beam location, and finds that it is different. The user terminal then examines the control signals associated with beam 2 to determine what beams are acceptable mates to beam 2 in a spot-beam pair. Presumably, the acceptable pairs will include spot beam 1, as well as others, such as spot beam 3, for example. Since spot beam 2 is an acceptable pairing with spot beam 1, the user terminal transmits to the ground network the identities of the pair of spot-beams including spot beam 1 and spot beam 2, and records in its local memory that beams 1 and 2 are registered. The ground network registers the pair as the location of that particular user terminal. As mentioned above, when the ground network initiates communication with that particular user terminal, it does so initially by transmissions over spot beams 1 and 2. This avoids the wasted time and resources required to poll all of the spot beams to find one, without the system loading required to continuously update a user terminal spot beam location register which stores only one spot beam location for each user terminal.

When a user terminal moves out of its normal spot beam location, say to a location remote from the original one, and served by a completely different set of spot beams, at turn-on it will examine the available signal carriers, and decide on the spot beam it is "in" as being, for example, spot beam 17. The user terminal will then examine its internal store indicating which spot beam(s) are recorded or registered with the communication system, and if the spot beam in which it is located is one of those recorded, no action is taken. If the spot beam in which the user terminal finds itself is not one of those in its internal store, it then proceeds with an update in the usual manner.

Other embodiments of the invention will be apparent to those skilled in the art. For example, while the description explicitly set forth the transmission of one forward control signal on each spot beam, there may be plural forward control signals on each spot beam, including at least one for each gateway of the system. Similarly, the number of return control signals uplinked on each spot beam depends on the number of user terminals which happen to be sending control information at any particular moment.

What is claimed is:

1. A spacecraft cellular communication system, comprising:

a spacecraft in an inclined geosynchronous orbit, said spacecraft including a transponder for receiving uplink signals and for transmitting information on a plurality of spot beams covering a service region:

a ground network for generating system control signals, for maintaining a register of user terminal spot beam locations, and including an Earth station for communicating with said spacecraft;

at least one terrestrial user terminal located within said service region of said spacecraft, said user terminal being capable of identifying that one of said spot beams in which it lies by examining said control signals, and of remembering the spot beam by which it was last connected to the system, and also being capable of transmitting spot beam location update information to said network control center when said spot beam location has changed since the last system connection of said user terminal:

said spacecraft, in order to conserve propellant, allowing stationkeeping position variation, which results in a diurnal variation of the station of said spacecraft, which in turn results in a tendency toward diurnal variation in the locations within the service area at which spot beam overlap occurs, thereby causing those of said user terminals located near said overlap regions to experience a diurnal change in spot beam location, thereby necessitating transmission of location updates over said communication system, which undesirably loads the communication system;

additional means at said ground network, for storing at least a spot-beam pair location for each of said user terminals, and for, when initiating communication with a particular one of said user terminals, transmitting to said particular one of said user terminals over said pair of spot beams;

at each of said user terminals, additional means for storing information relating to one of (a) the spot beam location which said user terminal last registered with said ground network and (b) the spot beam location pair which said user terminal last registered with said ground network, and further including means for comparing the spot beam location of the current communication of said user terminal over the communication system with the spot beam locations stored in said additional means, and for transmitting spot beam location update information to said ground system only if said spot beam location of said current communication is not found in said additional means, whereby no update information is transmitted as long as said user terminal is in a spot beam pair.

* * * * *